(12) United States Patent
Gill

(10) Patent No.: US 11,113,772 B2
(45) Date of Patent: Sep. 7, 2021

(54) METHOD AND APPARATUS FOR ACTIVITY NETWORKING

(71) Applicant: Cynthia Gill, Englewood, NJ (US)

(72) Inventor: Cynthia Gill, Englewood, NJ (US)

( * ) Notice: Subject to any disclaimer, the term of this patent is extended or adjusted under 35 U.S.C. 154(b) by 756 days.

(21) Appl. No.: 15/055,622

(22) Filed: Feb. 28, 2016

(65) Prior Publication Data

US 2017/0249706 A1 Aug. 31, 2017

(51) Int. Cl.
*G06Q 50/00* (2012.01)
*G06Q 10/10* (2012.01)

(52) U.S. Cl.
CPC ......... *G06Q 50/01* (2013.01); *G06Q 10/1095* (2013.01)

(58) Field of Classification Search
None
See application file for complete search history.

(56) References Cited

U.S. PATENT DOCUMENTS

| | | | | | |
|---|---|---|---|---|---|
| 2004/0128181 | A1* | 7/2004 | Zurko | ................ | G06Q 10/1095 705/7.19 |
| 2004/0199580 | A1* | 10/2004 | Zhakov | ............... | H04L 12/1818 709/204 |
| 2008/0132215 | A1* | 6/2008 | Soderstrom | ......... | H04L 12/1818 455/416 |
| 2009/0254840 | A1* | 10/2009 | Churchill | .............. | G06F 3/0481 715/753 |
| 2010/0049808 | A1* | 2/2010 | Rosenberg | ............. | G06Q 10/10 709/206 |
| 2013/0179501 | A1* | 7/2013 | Murphy, Jr. | ........ | G06Q 10/1095 709/204 |
| 2013/0263020 | A1* | 10/2013 | Heiferman | .......... | H04L 12/1818 715/753 |
| 2014/0006518 | A1* | 1/2014 | Sinkov | .................... | H04L 51/32 709/205 |
| 2014/0012608 | A1* | 1/2014 | Hecht | ..................... | G06Q 50/01 705/5 |
| 2014/0229560 | A1* | 8/2014 | Gray | ................... | G06Q 10/1095 709/206 |
| 2014/0297337 | A1* | 10/2014 | Geraci | ................... | G06Q 10/02 705/5 |
| 2014/0357226 | A1* | 12/2014 | Charugundla | ........ | H04W 4/023 455/411 |
| 2015/0058148 | A1* | 2/2015 | Grosz | ................ | G06Q 30/0269 705/26.2 |

(Continued)

OTHER PUBLICATIONS

Jackqueline Howard, Loneliness Is Bad for You, and This Study May Help Explain Why, Published on Nov. 28, 2015, Retrieved on Dec. 28, 2015 from http://www.huffingtonpost.com/entry/lonelinessbadforyou_56548ffbe4b0258edb32fc88.

(Continued)

*Primary Examiner* — Deirdre D Hatcher

(57) ABSTRACT

An apparatus for activity networking, comprising: a memory coupled to at least one processor, the processor being configured to: transmit, to a server, a request to form a crew, the request including an indication of an activity associated with the crew, an indication of a time for performing the activity, and an indication of a number of available spots on the crew; receive from the server a message indicating that all spots on the crew are occupied by a plurality of users; and provide the plurality of users with a calendar appointment for the activity.

20 Claims, 14 Drawing Sheets

(56) References Cited

U.S. PATENT DOCUMENTS

| | | | | |
|---|---|---|---|---|
| 2016/0021179 A1* | 1/2016 | James | ............... | G06F 3/04817 709/204 |
| 2016/0192190 A1* | 6/2016 | Hartley | ............... | H04W 12/06 709/225 |
| 2017/0046660 A1* | 2/2017 | Jaiswal | ............ | G06Q 10/1093 |

OTHER PUBLICATIONS

Andrea Bonior, You're Not Alone: Needing and Making New Friends As an Adult, Published on Mar. 14, 2013, Retrieved on Dec. 28, 2015 from http://www.huffingtonpost.com/andrea-bonior/making-new-friends-as-an-adult_b_2854095.html.

Alex Williams, Friends of a Certain Age, Published on Jul. 13, 2012, Retrieved on Dec. 28, 2015 from http://www.nytimes.com/2012/07/15/fashion/the-challenge-of-making-friends-as-an-adult.html?_r=0.

Melanie Gorman, Adult Friendship 101: Tips for Making New Friends After 35, Published on Dec. 7, 2010, Retrieved on Dec. 28, 2015 from http://www.huffingtonpost.com/melanie-gorman/adult-friendship-101_b_789388_html.

Patty Sewall, 5 New Ways to Network (That You Wont Dread), Published on Apr. 10, 2012, Retrieved on Dec. 28, 2015 from http://www.forbes.com/sites/dailymuse/2012/04/10/5-new-ways-to-network-that-you-wont-dread/.

Marie Lodi, Hey! VINA: a New App That's Like Tinder for Girl Friends, Published on Jan. 29, 2016, Retrieved on Feb. 7, 2016 from http://jezebel.com/hey-vina-a-new-app-that-s-like-tinder-for-girl-friend-1755869678.

Dorie Clark, How to Make Networking Fun, Published on Apr. 20, 2015, Retrieved on Dec. 28, 2015 from http://www.fastcompany.com/3044961/hit-the-ground-running/how-to-make-networking-fun.

Stephanie Vozza, How to Make New Friends As an Adult, Published on Nov. 14, 2014, Retrieved on Dec. 28, 2015 from http://www.fastcompany.com/3038537/how-to-make-new-friends-as-an-adult.

Jessie Sholl, Making Friends as an Adult, Published in Apr. 2014, Retrieved on Dec. 28, 2015 from https://experiencelife.com/article/making-friends-as-an-adult/.

Shana Lebowitz, How to Make New Friends (and Keep the Old) as a Young Adult, Published on Aug. 3, 2015, Retrieved on Dec. 28, 2015 from http://greatist.com/happiness/how-to-make-keep-friends.

Kyle Ingham, Making Guy Friends as a Man: Male Friendship 101, Retrieved on Dec. 28, 2015 from http://www.thedistilledman.com/making-guy-friends-as-a-man/.

* cited by examiner

METHOD AND APPARATUS FOR ACTIVITY NETWORKING

BACKGROUND

Technical Field

The present disclosure relates to electronic devices, in general, and, more particularly, to a method and apparatus for activity networking.

Description of the Related Art

We live in an increasingly mobile society, where long-term job assignments, career relocations and extended vacations remove people from familiar surroundings and existing social circles. Due to the absence of an existing social circle, people in these situations find that their favorite leisure activities—for example, brunch, bowling, or hiking—are no longer possible, thus eliminating a fundamental component of their quality of life. Accordingly, the need exists for new tools and techniques that can help uprooted individuals easily discover and connect with new contacts who share their interests and enjoy the same leisure activities.

SUMMARY

According to aspects of the disclosure, an apparatus is provided for activity networking, comprising: a memory coupled to at least one processor, the processor being configured to: transmit, to a server, a request to form a crew, the request including an indication of an activity associated with the crew, an indication of a time for performing the activity, and an indication of a number of available spots on the crew; receive from the server a message indicating that all spots on the crew are occupied by a plurality of users; and provide the plurality of users with a calendar appointment for the activity.

According to aspects of the disclosure, a method is provided for activity networking, comprising: transmitting, from an electronic device to a server, a request to form a crew, the request including an indication of an activity associated with the crew, an indication of a time for performing the activity, and an indication of a number of available spots on the crew; receiving, by the electronic device, a message indicating that all spots on the crew are occupied by a plurality of users; and provide the plurality of users with a calendar appointment for the activity.

According to aspects of the disclosure, a server for activity networking, comprising: a memory and at least one processor operatively coupled to the memory, configured to: generate a data structure associated with a crew in response to receiving a request to form the crew, the data structure including an indication of available spots on the crew and an indication of a condition for joining the crew; modify the data structure in response to a request to join the crew, wherein modifying the data structure includes decrementing the indication of available spots on the crew; detect whether all spots on the crew are occupied by a plurality of users; and start a communications session associated with the crew in response to detecting that all spots on the crew are occupied, wherein participation in the communications session is limited to the plurality of users and a founder of the crew.

According to aspects of the disclosure, a method is provided for activity networking, comprising: generating, by a server, a data structure associated with a crew in response to receiving a request to form the crew, the data structure including an indication of available spots on the crew and an indication of a condition for joining the crew; modifying the data structure in response to a request to join the crew, wherein modifying the data structure includes decrementing the indication of available spots on the crew; detecting whether all spots on the crew are occupied by a plurality of users; and starting, by the server, a communications session associated with the crew in response to detecting that all spots on the crew are occupied, wherein participation in the communications session is limited to the plurality of users and a founder of the crew.

DETAILED DESCRIPTION

Figure 1:
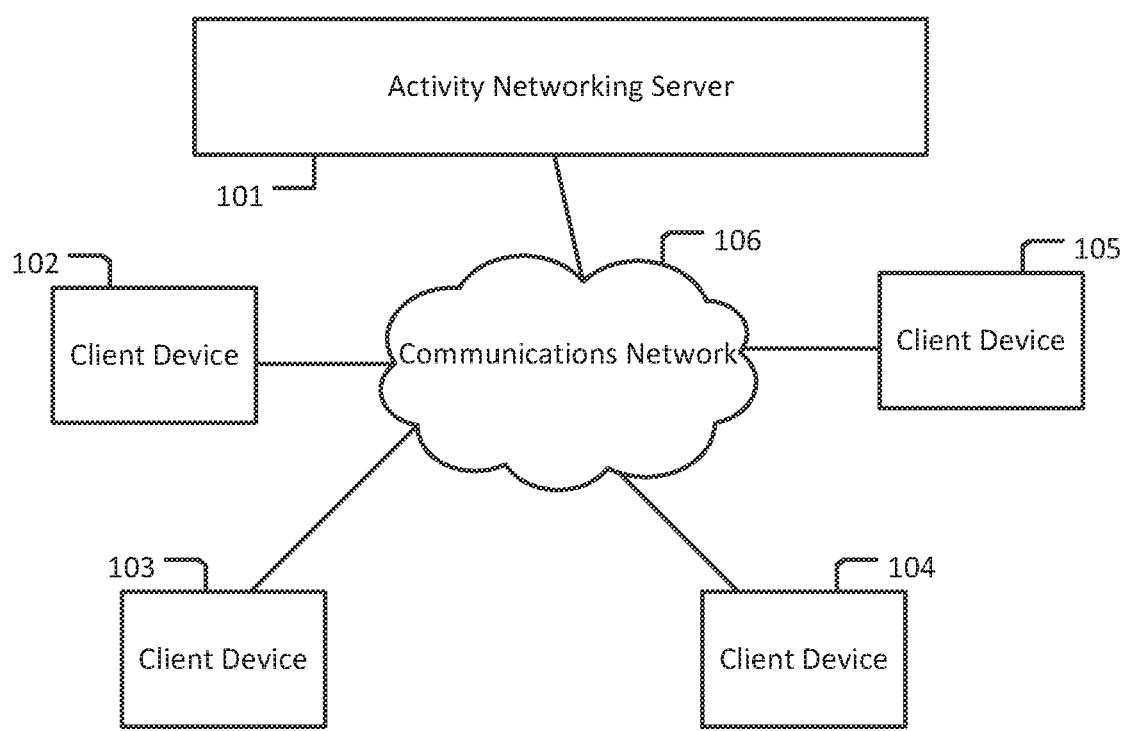
FIG. 1 is a diagram of an example of a system, according to aspects of the disclosure.

Reference will now be made in detail to embodiments of the invention. Wherever possible, same or similar reference numerals are used in the drawings and the description to refer to the same or like parts or steps. The drawings are in simplified form and are not to precise scale. The term "crew" as used throughout the disclosure may refer to a group of people (e.g., users), who are assembled for the purpose of participating in an activity together. The activity may include any suitable type of recreational or professional activity, such as, for example, bowling, hiking, rock climbing, professional networking, and wine tasting. Optionally, the size of the crew may be limited to between two and four members.

FIG. 1 is a diagram of an example of a system 100, according to aspects of the disclosure. As illustrated, the system 100 includes an activity networking server (ANS) 101, client devices 102-105, and a communications network 106.

According to aspects of the disclosure, the ANS 101 may be any suitable type of computing device (or system) that is capable of hosting a user profile database (UDB) and a crew database (CDB). In operation, the ANS 101 may interact with the client devices 102-105 to help users form crews for participating in various activities. As noted above, a "crew" may be a group of users who have assembled to participate together in a particular activity. After a given crew is formed, its members may meet in person and engage in an activity associated with the crew. For example, the members may meet to bowl.

The client devices 102-105 may include any suitable type of computing device. For example, any of the client devices 102-105 may include a smartphone, a desktop computer, a laptop, a gaming console, a digital media player, etc. The communications network 106 may include one or more of a local area network (LAN), a wide area network (WAN), a wireless network (e.g., 802.11, 4G, etc.), and or any other suitable type of network.

Figure 2:
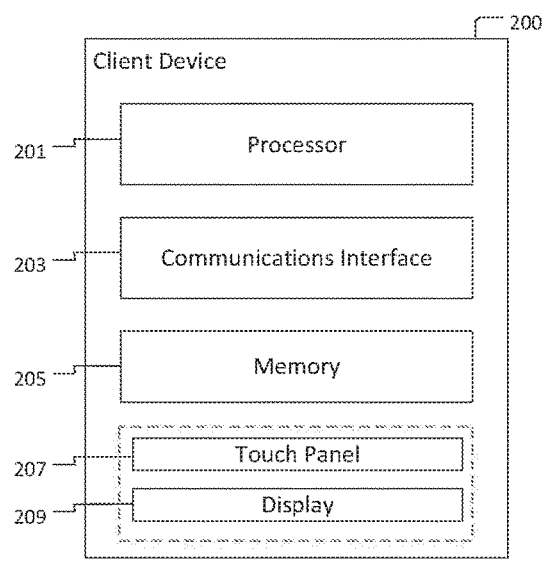
FIG. 2 is a diagram of an example of a client device, according to aspects of the disclosure.

FIG. 2 is a diagram of an example of a client device 200, according to aspects of the disclosure. As illustrated, the client device 200 includes a processor 201, a communications interface 203, a memory 205, a touch panel 207, and a display 209. According to aspects of the disclosure, the processor 201 may include any suitable type of processing circuitry, such as a general-purpose processor (e.g., an ARM-based processor), an application-specific integrated circuit (ASIC), or a Field-Programmable Gate Array (FPGA). The communications interface 203 may include any suitable type of communications interface, such as a WiFi interface, an Ethernet interface, a Long-Term Evolution (LTE) interface, a Bluetooth Interface, an Infrared interface, etc. The memory 205 may include any suitable type of volatile and non-volatile memory, such as random-access memory (RAM), read-only memory (ROM), flash memory, cloud storage, or network accessible storage (NAS), etc. The touch panel 207 may include any suitable type of touch panel, such as a capacitive or resistive touch panel. The display 209 may include any suitable type of display such as a liquid crystal display (LCD), a light-emitting diode (LED) display, or an active-matrix organic light-emitting diode (AMOLED) display. In some implementations, the touch panel 207 may be layered onto the display 209 to form a touchscreen. Although not shown, the client device 200 may include additional (or alternative) input devices, such as a microphone, a keyboard, a mouse, etc.

Figure 3:
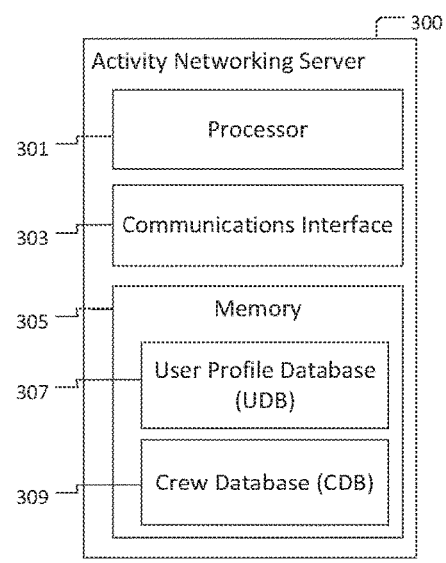
FIG. 3 is a diagram of an example of an activity networking server (ANS), according to aspects of the disclosure.

FIG. 3 is a diagram of an example of an activity network server (ANS) 300, according to aspects of the disclosure. As illustrated, the ANS 300 includes a processor 301, a communications interface 303, and a memory 305. According to aspects of the disclosure, the processor 301 may include any suitable type of processing circuitry, such as a general-purpose processor (e.g., an ARM-based processor), an application-specific integrated circuit (ASIC), or a Field-Programmable Gate Array (FPGA). The communications interface 303 may include any suitable type of communications interface, such as a WiFi interface, an Ethernet interface, a Long-Term Evolution (LTE) interface, a Bluetooth Interface, an Infrared interface, etc. The memory 305 may include any suitable type of volatile and non-volatile memory, such as random-access memory (RAM), read-only memory (ROM), a hard disk (HD), a solid state drive (SSD), a CD-ROM, flash memory, cloud storage, or network accessible storage (NAS). In some implementations, the memory 305 may store a user profile database (UDB) 307 and a crew database (CDB) 309.

The UDB 307 may include any suitable type of data structure that is arranged to store one or more profile records. By way of example, the UDB 307 may include one or more of a file system folder, a relational database, an SQL database, etc. Each profile record may include a data structure containing user profile information. The user profile information may include any suitable type of information relating to a given user. For example, the user profile information may include one or more of the following information items:

(1) an indication of the user's name;
(2) an indication of the user's age;
(3) an indication of the user's profession;
(4) an indication of one or more languages spoken by the user;
(5) an indication of the user's gender;
(6) an indication of the user's hobb(ies);
(7) an indication of an alias (e.g., username) corresponding to the user;
(8) an indication of the user's location (e.g., GPS coordinates, a name of city and state, a name of a neighborhood, etc.);
(9) an indication of one or more activities in which the user would like to engage (e.g., bowling, hiking, etc.);
(10) an indication of skill level(s) of the user in the one or more activities;
(11) an indication of an alias (e.g., username) corresponding to the user;
(12) an indication of one or more time windows in which the user is available to participate in the activity; and/or
(13) an indication of crewmate preferences; e.g., an indication of one or more preferred characteristics for the people with whom the user is willing to participate in a crew, such as age, location, profession, languages spoken, gender, education level, profession, etc.;
(14) an image associated with the user (e.g., a photo of the user, an avatar, etc.).

Figure 9:
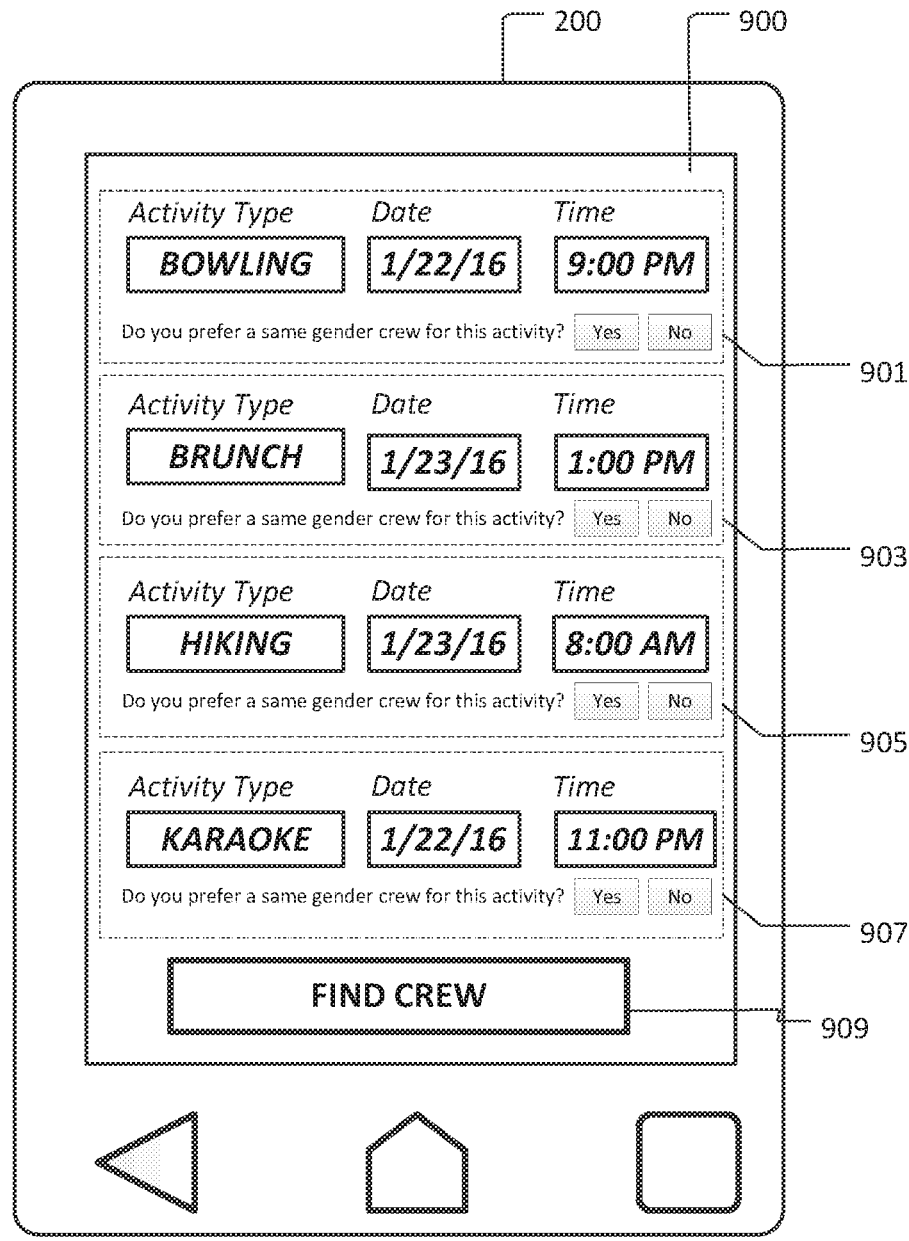
FIG. 9 is a diagram of an example of a user interface, according to aspects of the disclosure.

The CDB 309 may include any suitable type of data structure that is configured to store one or more crew records. By way of example, the CDB 309 may include one or more of a file system folder, a relational database, an SQL database, etc. For example, the crew record for a given crew may include one or more of the following crew information items:

(1) an indication of the name of the crew;
(2) an indication of the size of the crew (e.g., maximum number of people that are allowed to be on the crew); according to aspects of the disclosure, the size of the crew—may be user-specified or pre-set; for example, the size of the crew may be specified via a user interface, such as the screen 900, which is shown in FIG. 9; as another example, the size of the crew be pre-set by the ANS 300 in order to avoid users having decision paralysis; for example, the size of the crew may be limited to four people by the ANS 300;
(3) an indication of an activity associated with the crew;
(4) an indication of a location where the crew intends to meet in order to engage in the activity;
(5) an indication of a language spoken by the crew;
(6) an indication of a location associated with the crew (e.g., GPS coordinates, name of city, and state, a name of neighborhood, etc.);
(7) an indication of a membership condition (e.g., an indication of one or more characteristics which users must possess in order to be permitted to join the crew; such as age, gender, profession, etc.);
(8) an indication of a predetermined number of crew members who must confirm their membership in order for a calendar appointment for an activity associated with the crew to be distributed;

(9) an indication of a date and time when the members of the crew are expected to meet in order to engage in the activity; and/or

(10) an identifier of a communications session associated with the crew.

Although in this example the ANS 300 is presented as an integrated device, in some implementations the ANS 300 may be implemented as a network of computers, and/or a server farm. For instance, the UDB 307 and the CDB 309 may be hosted on different computers. Moreover, any of the UDB 307 and the CDB 309 may be hosted on multiple computers.

Figure 4:
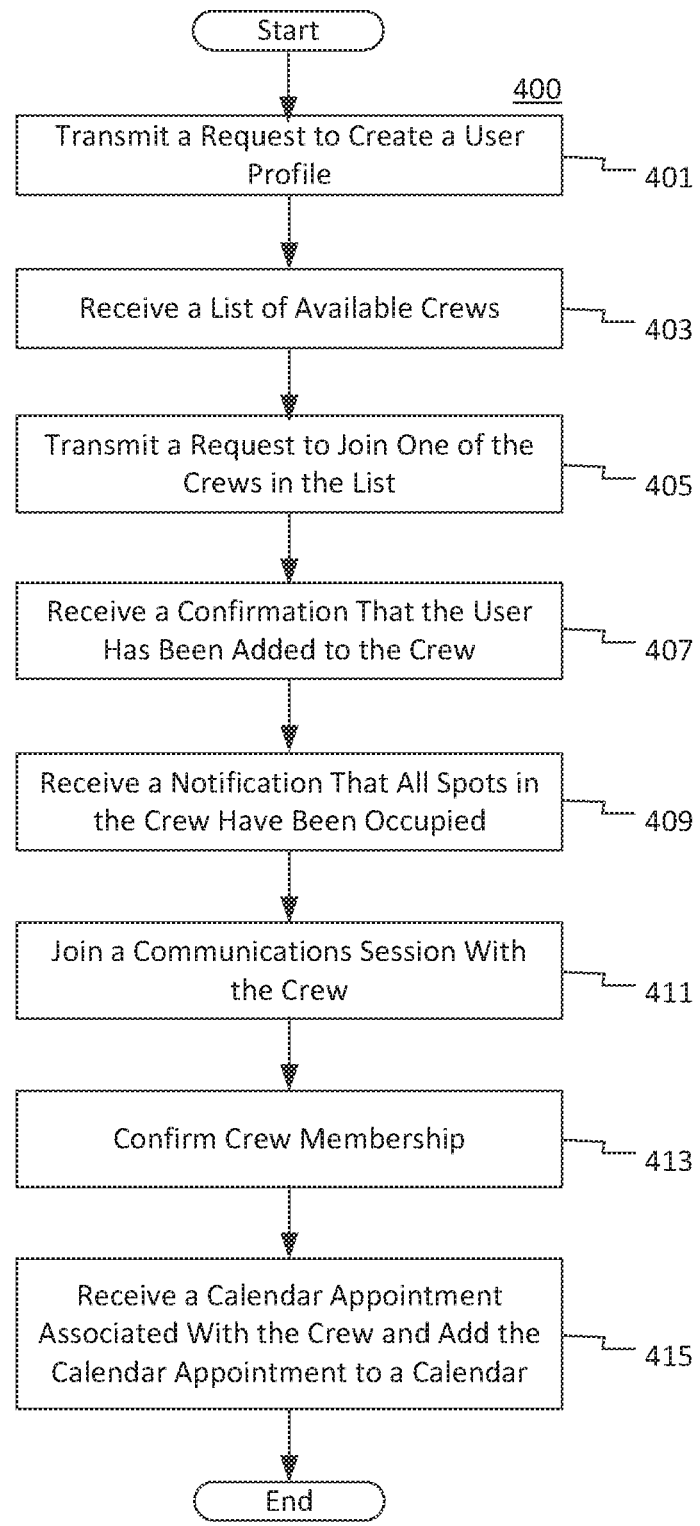
FIG. 4 is a flowchart of an example of a process, according to aspects of the disclosure.

FIG. 4 is a flowchart of an example of a process 400, according to aspects of the disclosure. The process 400 may be performed by the client device 200 on behalf of a user of the client device 200.

In operation 401, the client device 200 transmits the ANS 300 a request to create a new user profile. More particularly, the client device 200 may receive user input specifying one or more user profile information items. Afterwards, the client device 200 may generate the request based on the user profile information items and transmit it. The user profile information items may be transmitted to the ANS 300 together with the request and/or separately.

In operation 403, the client device 200 receives a list of available crews that match the user's profile. In this example, the list of available crews is transmitted automatically by the ANS 300 when the user profile is created. However, in some implementations, the list of available crews may be transmitted by the ANS 300 in response to detecting that the client device 200 has logged in the ANS 300 and/or in response to a separate search query that is received from the client device 200.

According to aspects of the disclosure, the search query may identify one or more activities, as well as an indication of one or more time windows during which the user is available to participate in the activities. Additionally or alternatively, the search query may specify one or more additional search criteria. For example, the search query may specify that the user is interested in crews that include only males. Additionally or alternatively, the search query may specify that the user is interested in crews whose members are 35 and over, and/or crews whose members practice a particular profession (e.g., accounting).

In some implementations, the search query may specify that the user is interested in crews whose members possess the same characteristic as the user without explicitly specifying the characteristic. For example, the search query may specify that the user is interested in crews whose members are the same gender as the user, without identifying the user's gender explicitly. In such instances, upon receiving the search query, the ANS 300 may retrieve the user's profile from the UDB 307 to determine the user's gender before identifying one or more crews that satisfy the condition.

In operation 405, the client device 200 transmits a request to join one of the crews in the list. More particularly, in some implementations, the client device 200 may detect a user input selecting one of the crews in the list, and may transmit to the ANS 300 a message requesting that the user is added to the selected crew.

In operation 407, the client device 200 receives a confirmation that the user has been added to the selected crew. In some implementations, the confirmation may be transmitted by the ANS 300 when the user satisfies one or more criteria that are set for joining the crew. Additionally or alternatively, in instances in which the user does not meet all criteria for joining the crew, the client device 200 may instead receive an error message indicating that the user has been refused membership in the crew.

In operation 409, the client device 200 receives a message indicating that all spots on the crew have been occupied. The message may be transmitted by the ANS 300 when all available spots on the crew have been taken by different users. In some implementations, the message may include a unique identifier associated with the crew. The identifier may be an address of a messaging board associated with the crew, a telephone number, and/or any other suitable type of identifier that can be used for the conduct of a communications session associated with the crew.

In operation 411, the client device 200 joins a communications session associated with the crew by using the unique identifier that is included in the message received at operation 409. For example, the client device 200 may access a messaging board to which all crew members have been invited. On the messaging board, the user of the client device 200 may converse with the other crew members and determine whether the user and the other crew members are compatible enough to be willing to meet with them in person and engage in the activity associated with the crew.

In operation 413, the client device 200 transmits the ANS 300 a message confirming the user's membership in the crew. As noted above, the message may be transmitted when the user is satisfied with his or her interactions with the other crew members and has determined that the user wants to meet with them in person. Although not shown, the client device 200 may alternatively transmit a message indicating that the user wants to leave the crew. The latter message may be transmitted when the user has determined that he or she has no interest in meeting with the other crew members in person.

In operation 415, the client device 200 receives a calendar appointment for meeting with the rest of the crew and adds the appointment to a calendar application that is executed on the client device 200. In some implementations, the appointment may include an indication of an activity which the crew is formed for, and/or the location and time where the crew members are to meet in order to engage in the activity.

Figure 5:
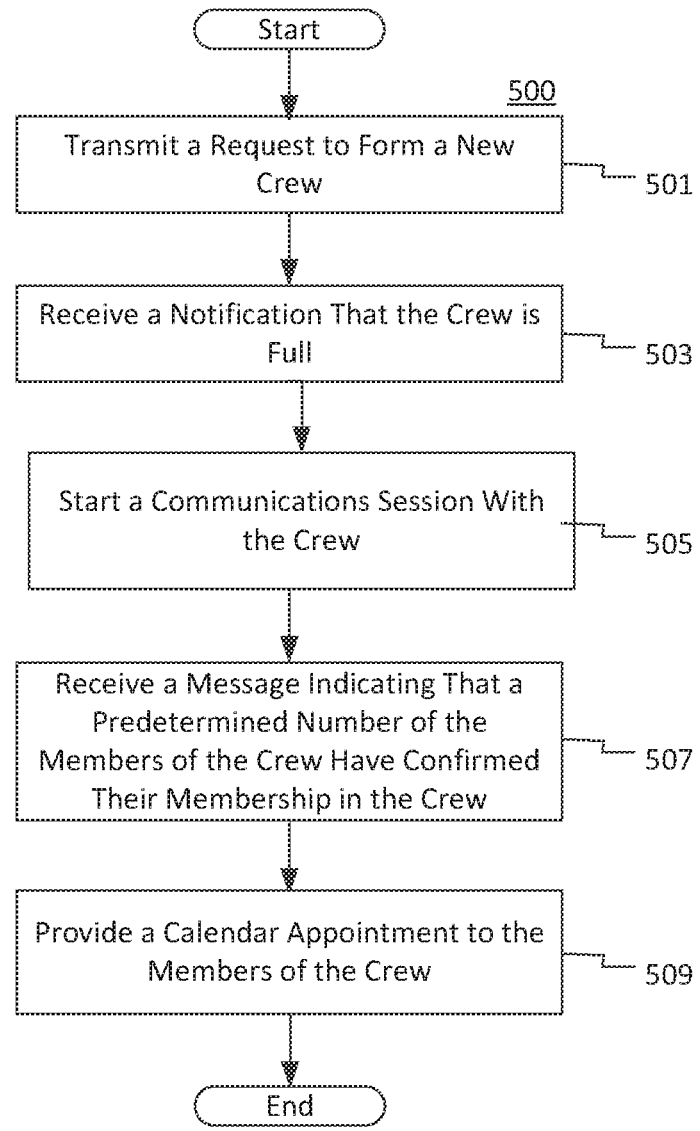
FIG. 5 is flowchart of an example of a process, according to aspects of the disclosure.

FIG. 5 is a flowchart of an example of a process 500, according to aspects of the disclosure. The process may be performed by the client device 200 on behalf of its respective user, as discussed above with respect to FIG. 4.

At operation 501, the client device 200 transmits to the ANS 300 a request for creating a new crew. The request may include any suitable type of crew information that is input by the user. For example, the crew information may specify an activity associated with the crew, and/or a date and time when the activity is to be performed. Additionally or alternatively, the crew information may specify the number of spots that are available on the crew. For example, the crew information may specify that the crew is limited to four (4) users. Additionally or alternatively, the crew information may specify one or more membership conditions. For example, the crew information may specify one or more characteristics which users must possess in order to be allowed to join the crew. For example, the crew information may specify that the crew is open only to males who are between ages 30 and 35 and have attended the University of Florida. In response to the request, the ANS 300 may create the crew and make it available for other users to join.

At operation 503, the client device 200 receives from the ANS 300 a message indicating that all spots on the crew have been occupied by different users.

In operation 505, the client device 200 starts a communications session associated with the crew. In some implementations, starting the communications session may include instantiating the communication session and/or distributing information for joining the communications session to the members of the crew. For example, the electronic device may transmit to the ANS 300 a request to instantiate a communication session associated with the crew, and/or distribute access information associated with the communications session among the members of the crew and the user of the client device 200 (i.e., the crew founder). In some implementations, the request may identify a type of the communications session (e.g., a chat session or a telephone call), and/or a time for the communications session. In response to the request, the ANS 300 may initiate the communications session and distribute an address for joining the communications session to the members of the crew and/or the user of the client device 200 (i.e., the crew founder). After joining the communications session, the members of the crew have the option to confirm their membership in the crew or leave the crew.

In operation 507, the client device 200 receives from the ANS 300 a message indicating that a predetermined number of the crew members (e.g., all crew members, 75% of the crew members, 3 of the crew members, etc.) have confirmed their participation in the crew.

In operation 509, the client device 200 transmits a request to the ANS 300 to distribute a calendar appointment associated with the crew to at least one of the users who have confirmed their crew membership and the user of the client device 200 (i.e., the crew founder). In some implementations, the request may include one or more of an identifier of an activity associated with the crew, an indication of a time at which the activity is to be performed, an indication of a venue/address where the crew members are to meet in order to engage in the activity, etc.

In some implementations, operations 507-509, may be performed without the involvement of the ANS 300. For example, the client device 200 may start the communications session by itself (e.g., by directly interacting with a particular messaging board server or by launching the messaging board server locally.). Afterwards, the client device 200 may directly receive, from the crew members, messages confirming and/or cancelling their membership in the crew. Based on those messages, the client device 200 may determine whether the predetermined number of crew members have confirmed their crew membership. And finally, the client device 200 may transmit the calendar appointment directly to each crew member who has confirmed his or her membership.

Figure 6A:
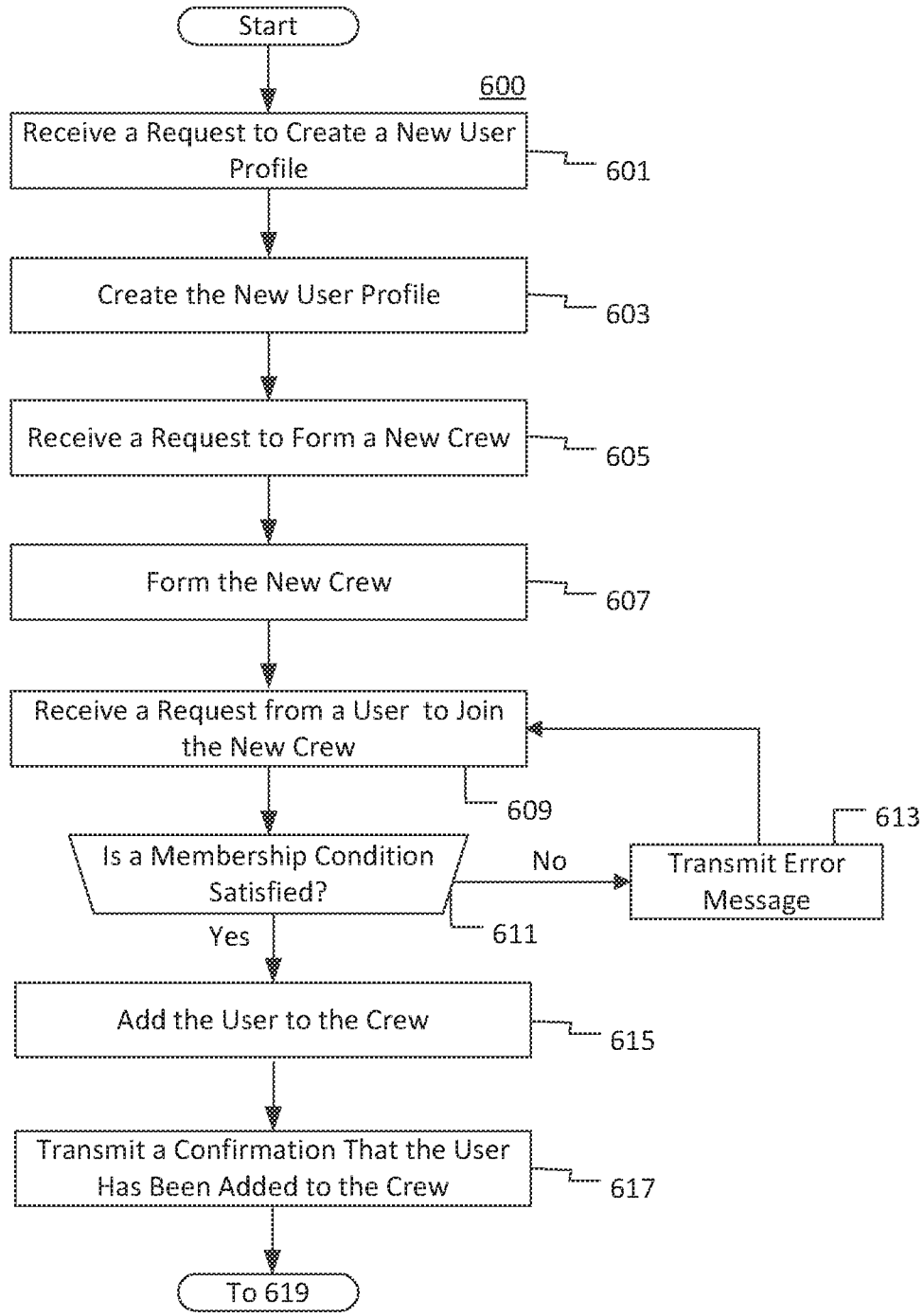
FIG. 6A is a flowchart of an example of a process, according to aspects of the disclosure.
Figure 6B:
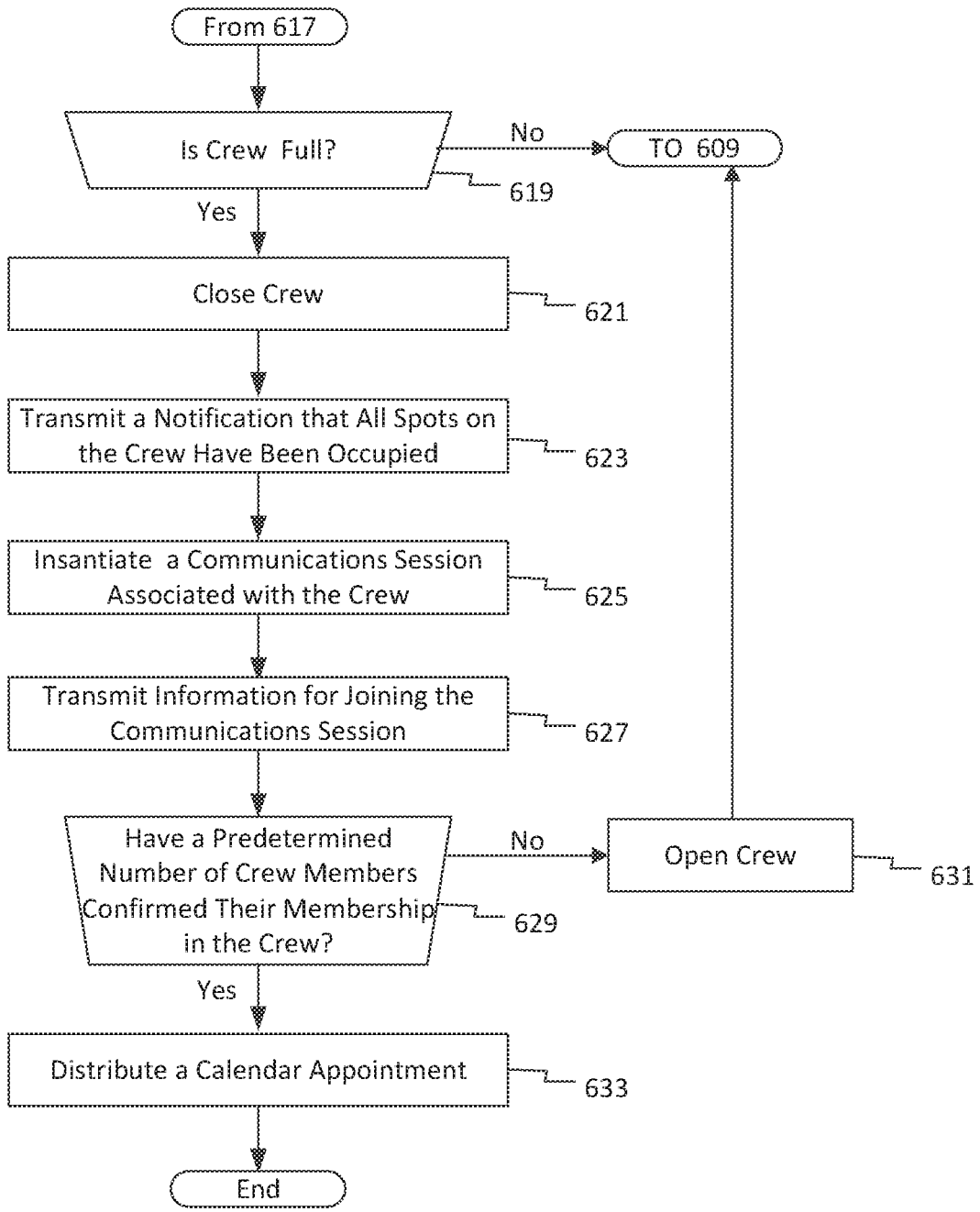
FIG. 6B is a flowchart of an example of a process, according to aspects of the disclosure.

FIG. 6A-B depict a flowchart of an example of a process 600, according to aspects of the disclosure. Although in this example the process 600 is performed by the ANS 300, in some implementations, at least some of the operations of the process 600 may be performed by the client device 200 instead.

In operation 601, the ANS 300 receives a request to create a user profile. In some implementations, the request may include one or more user profile information items. In some implementations, the request may be transmitted by the client device 200 on behalf of a first user (e.g., the user of the client device 200).

In operation 603, the ANS 300 creates the new profile for the first user in response to the request. In some implementations, creating the new profile may include creating a profile record including at least some of the user profile information items, and storing the profile record in the UDB 307.

In operation 605, the ANS 300 receives a request to form a new crew. In some implementations, the request may be transmitted by the client device 200 on behalf of the first user. In some implementations, the request may include one or more crew information items. For example, the request may specify one or more of: (1) an activity associated with the crew, (2) time and date when the activity is to be performed by the crew, (3) location where the crew will meet to perform the activity, and (4) a condition for joining the crew. The condition for joining the crew may specify one or more characteristics a user must possess in order for the user to be able to join the crew. For instance, the condition for joining the crew may specify that the crew is open only to males between the ages of 30 and 35.

In operation 607, the ANS 300 forms the new crew in response to the request. According to aspects of the disclosure, forming the new crew may include creating a crew database record including at least some of the crew information items that are received at operation 605, and storing the crew database record in the CDB 309.

In operation 609, the ANS 300 receives a request from a second user to join the crew. The request may be transmitted by a client device other than the client device 200 on behalf of the second user.

In operation 611, the ANS 300 determines whether the second user meets all (or a predetermined number of) criteria for membership in the crew. For example, the ANS 300 may retrieve the profile of the second user from the UDB 307 and determine whether the user possesses one or more characteristics that are required for membership in the crew. In instances in which membership in the crew is restricted based on age and gender, the ANS 300 may determine whether the user meets the age and gender criteria. If the user fails to meet the criteria, the process proceeds to operation 613. Otherwise, the process proceeds to operation 615.

In operation 613, the ANS 300 transmits an error message to the second user (or the second user's device) indicating that the second user is refused membership in the crew.

In operation 615, the ANS 300 adds the user to the crew. According to aspects of the disclosure, adding the user to the crew may include one or more of retrieving a record from the CDB 309 that corresponds to the crew and modifying the record. For example, the ANS 300 may modify the record to include an identifier corresponding to the second user. Furthermore, the ANS 300 may decrement a counter that is part of the record which indicates the number of available spots on the crew. And still furthermore, the ANS 300 may retrieve one or more user profile information items from the profile of the second user and store those information items in the crew record.

According to aspects of the disclosure, any user profile information that is added to the crew record may be used to search the CDB 309 later. For example, the ANS 300 may retrieve the age of the second user from the second user's profile and store an indication of the age of the second user in the crew record. Afterwards, when a search query is received at the ANS 300 for crews whose members' average age is 35, the ANS 300 may use the indication of the user's age that is stored in the crew record to determine the average age of the users who have already joined the crew.

In operation 617, the ANS 300 transmits a confirmation to the second user that the second user has been added to the crew.

In operation 619, the ANS 300 determines whether all spots on the crew are occupied. If there are remaining available spots on the crew, the process returns to operation 609, and the ANS 300 begins waiting for another request to join the crew to be received. Otherwise, the process proceeds to operation 621.

At operation 621, the ANS 300 closes the crew. According to aspects of the disclosure, closing the crew may include changing the value of a predetermined variable in the record corresponding to the crew. The predetermined variable may be set to a value which indicates that the crew should not be returned in any crew search results that are provided by the ANS 300 to client devices. Additionally or alternatively, the predetermined variable may be set to a value which indicates that the crew should not be identified with any client devices as one which is available for joining.

At operation 623, the ANS 300 transmits a message indicating that all spots on the crew have been occupied. The message may be transmitted to the founder of the crew (e.g., the first user).

At operation 625, the ANS 300 instantiates a communications session associated with the crew. For example, the ANS 300 may instantiate a messaging board (e.g., a chat room) that is restricted to the members of the crew. Additionally or alternatively, the ANS 300 may reserve a time slot at a teleconference bridge. In some implementations, the communications session may be instantiated automatically in response to detecting that all (and/or predetermined number of) spots on the crew are occupied. Alternatively, in some implementations, the communications session may be instantiated in response to receiving a specific request from the founder of the crew (e.g., the user of the client device 200).

At operation 627, the ANS 300 transmits information for joining the communications session. For example, to each of the crew members and/or the crew founder (e.g., the first user), the ANS 300 may transmit one or more of an address (e.g., a Uniform Resource Locator) for accessing the messaging board associated with the crew, a username for accessing the messaging board, and/or a password for accessing the messaging board. Additionally or alternatively, the ANS 300 may transmit an address (e.g., a telephone number) for dialing the teleconference bridge, an indication of a time when a teleconference with the crew members will take place, a username (or ID) for joining the teleconference, and/or an access code for joining the teleconference. In some implementations, the information may be transmitted in response to detecting that all (and/or predetermined number of) spots on the crew have been occupied. Additionally or alternatively, in some implementations, the information may be transmitted in response to receiving a specific request from the founder of the crew (e.g., the user of the client device 200).

In operation 629, the ANS 300 determines whether a predetermined number of users have confirmed their membership in the crew. For example, the ANS 300 may determine whether all crew members have confirmed their membership in the crew. As another example, the ANS 300 may determine whether a predetermined percentage and/or number of the crew members have confirmed their membership in the crew (e.g., 75% or 3 crew members). More particularly, in some implementations, the client device 200 may count the number of received crew membership confirmations and crew membership cancellations to determine if the predetermined numbers of crew members have confirmed their membership in the crew. For instance, if more than an acceptable number of crew members have canceled their crew membership (e.g., at least one, more than 25% of the crew members, more than 1 crew member, etc.), the process proceeds to operation 631. Otherwise, if the predetermined number of crew members have confirmed their membership in the crew, the process proceeds to operation 633.

In operation 631, the crew is opened. According to aspects of the disclosure, opening the crew may include resetting the above-discussed predetermined variable to its original value. As indicated, setting the predetermined variable to its original value may cause the crew to appear in crew searches that are performed by different users and/or otherwise become visible to the users. Afterwards, the process returns to operation 609, and the ANS 300 begins waiting to receive another request to join the crew.

In operation 633, the ANS 300 transmits a calendar appointment to the members of the crew. According to aspects of the disclosure, the calendar appointment may include a data structure which identifies the date, time, and/or location when the members of the crew are scheduled to meet in order to engage in an activity that is associated with the crew. In some implementations, the calendar appointment may be transmitted automatically by the server (e.g., by using a push notification service) in response to receiving a predetermined number of crew membership confirmations from the members of the crew. Additionally or alternatively, in some implementations, the calendar appointment may be distributed in response to a specific request from the founder of the crew.

Figure 7:
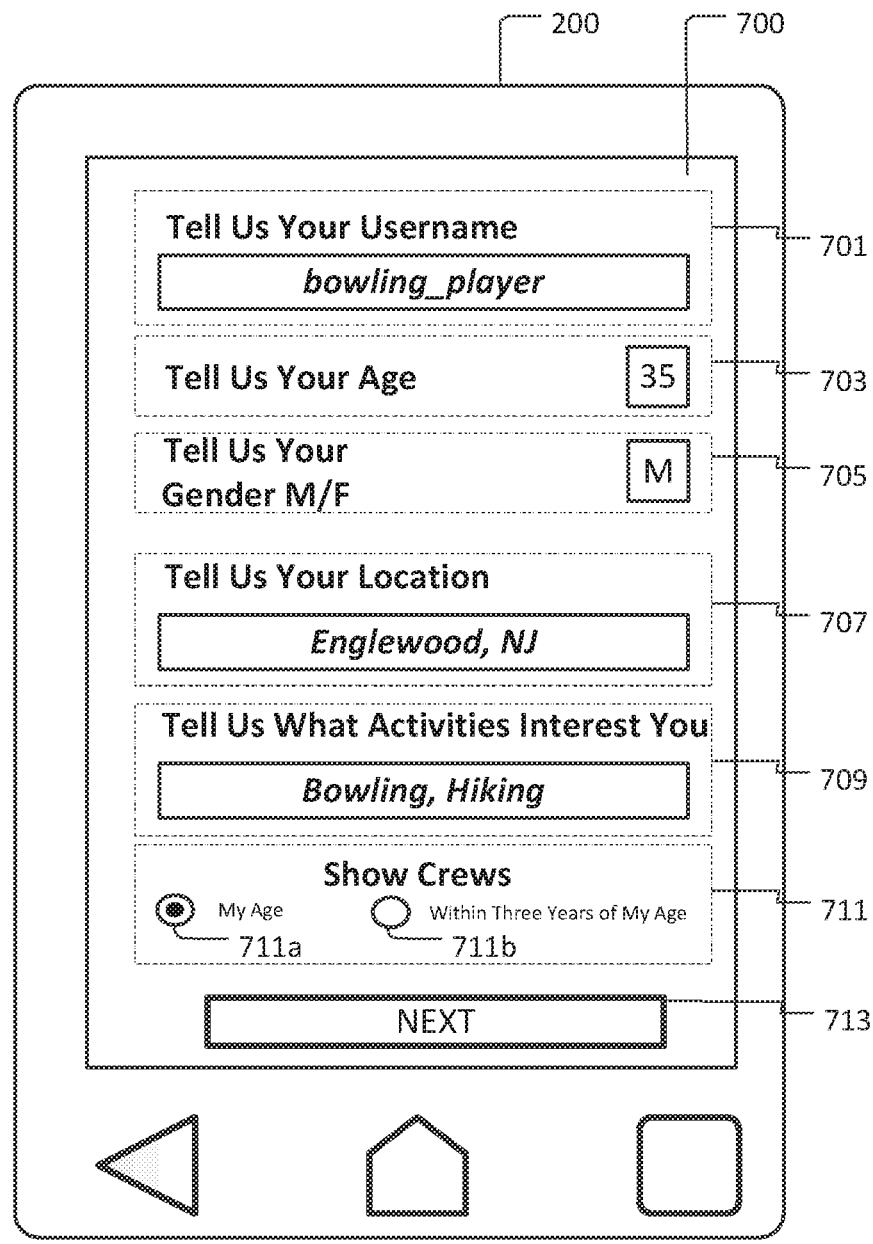
FIG. 7 is a diagram of an example of a user interface, according to aspects of the disclosure.
Figure 8:
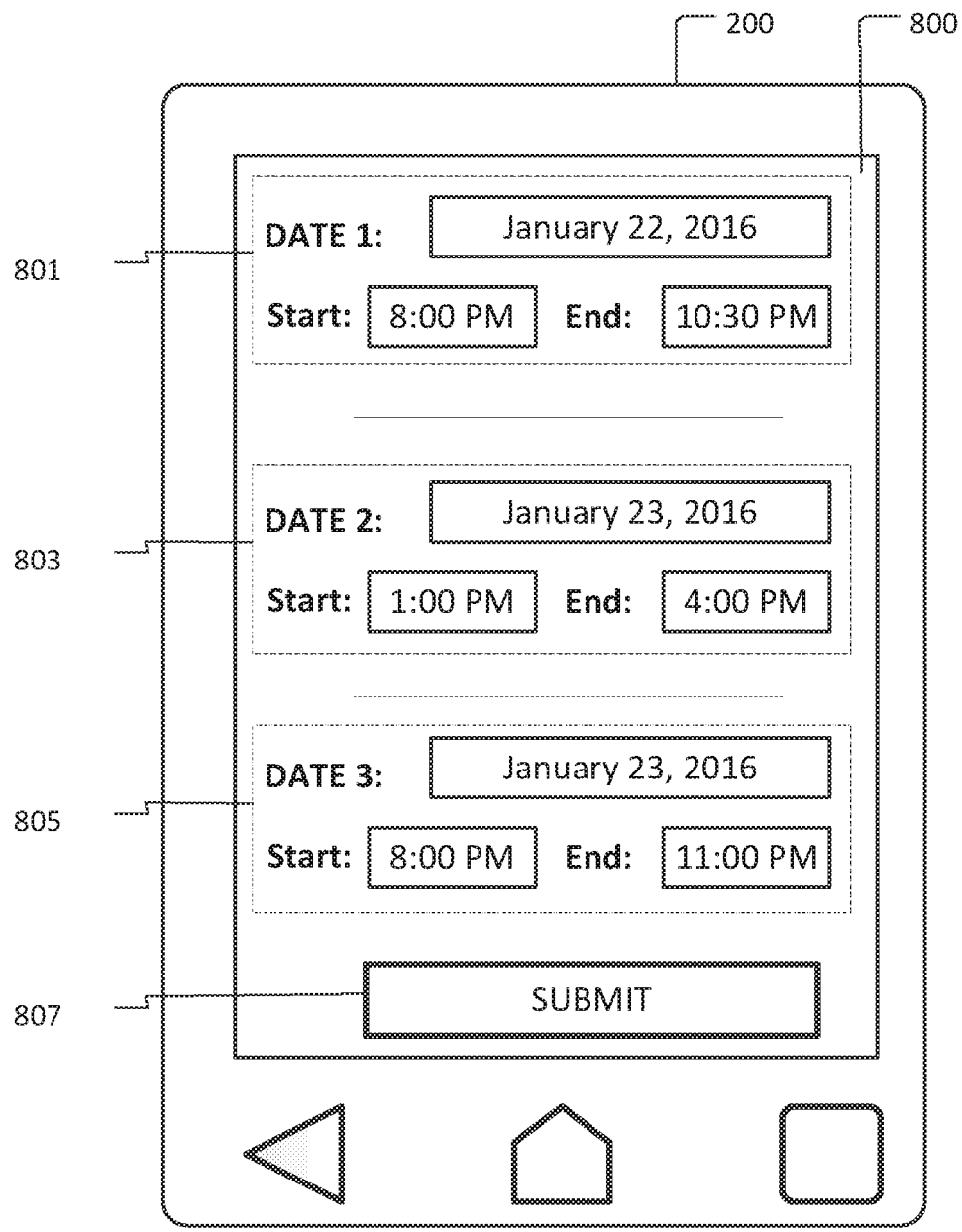
FIG. 8 is a diagram of an example of a user interface, according to aspects of the disclosure.

FIGS. 7-8 are diagrams of a user interface for creating a user profile, according to aspects of the disclosure. As illustrated, the user interface may include a screen 700 (shown in FIG. 7) and a screen 800 (shown in FIG. 8). The screen 700 may be displayed on the client device 200 when the user of the client device 200 registers with the ANS 300 for the first time. As illustrated, the user interface may include input areas 701-711 and a next button 713.

In some implementations, the input area 701 may include a text input field for entering a username for the user (e.g., bowling_player). The input area 703 may include a text input field for entering the user's age. The input area 705 may include a text input field for entering the user's gender. The input area 707 may include a text input field for entering the user's location (e.g., Englewood, N.J.). The input area 709 may include a text input field for entering one or more activities which the user is interested in (e.g., hiking and bowling). Although in this example, the input areas 701-709 include text input fields for entering user profile information, any suitable type of input component may be used instead. For example, any of the input areas 701-709 may include a drop-down menu for entering the area's respective type of user profile information, a pop-up menu for entering the area's respective type of user profile information, etc.

The input area 711 may include one or more input components for specifying the characteristics of potential crew members the user wants to be on a crew with (or participate in activities with). As illustrated in this example, the input area 711 may include radio buttons 711a and 711b. If the user wants to participate in activities only with people who are the user's age, the user may select the first radio button 711a. Alternatively, if the user wants to participate in activities with people who are within three (3) years of the user's age, the user may select the second radio button 711b. Although in this example the input area 711 is used to specify a preferred age for the user's fellow crewmates, in some implementations any other suitable type of preferred characteristic of the fellow crewmates may be specified via the input area 711, such as age, location, gender, languages spoken, educational level or profession. Although in this example radio buttons are used, any other suitable type of input component may be used instead, such as push buttons, drop-down menus, text input fields, etc.

When the button 713 is pressed, the client device 200 may hide the screen 700 and display screen 800 in its place. In some implementations, the button 713 may be replaced with any other suitable type of input component. Additionally or alternatively, in some implementations, the button may be altogether omitted, and the screen transition may be performed in response to a predetermined type of touch gesture.

As illustrated in FIG. 8, the screen 800 may provide an interface for entering the dates and times when the user is available to participate in the activities that interest the user, and it may include input areas 801, 803, and 805. Each of the input areas 801-805 may include a text input field for entering the date when the user is available, as well as text input fields for specifying time windows during which the user is available. In the present example, the user is available on: (i) Jan. 22, 2016, from 8 pm to 10:30 pm (input area 801), (ii) Jan. 23, 2016, from 1:00 p.m. to 4:00 p.m. (input area 803), and (iii) Jan. 23, 2016, from 8 p.m. to 11:00 p.m. Although in this example, text input fields are used to specify the user's availability, in some implementations, any other suitable type of input component may be used instead, such as push buttons, drop-down menus, radio buttons, etc.

After the user has entered his or her availability, the user may press the submit button 807. When the client device 200 detects that the submit button 807 is pressed, the client device 200 may generate a request to create a user profile, after which the client device 200 may transmit the request to the ANS 300. In some implementations, the request may include any of the user profile information items that are specified in the input areas 701-711 and 801-805. In some implementations, the button 807 may be replaced with any other suitable type of input component. Additionally or alternatively, in some implementations, the button 807 may be altogether omitted, and the request may be generated and/or transmitted when a predetermined type of touch gesture is performed on the screen of the client device 200.

Figure 10:
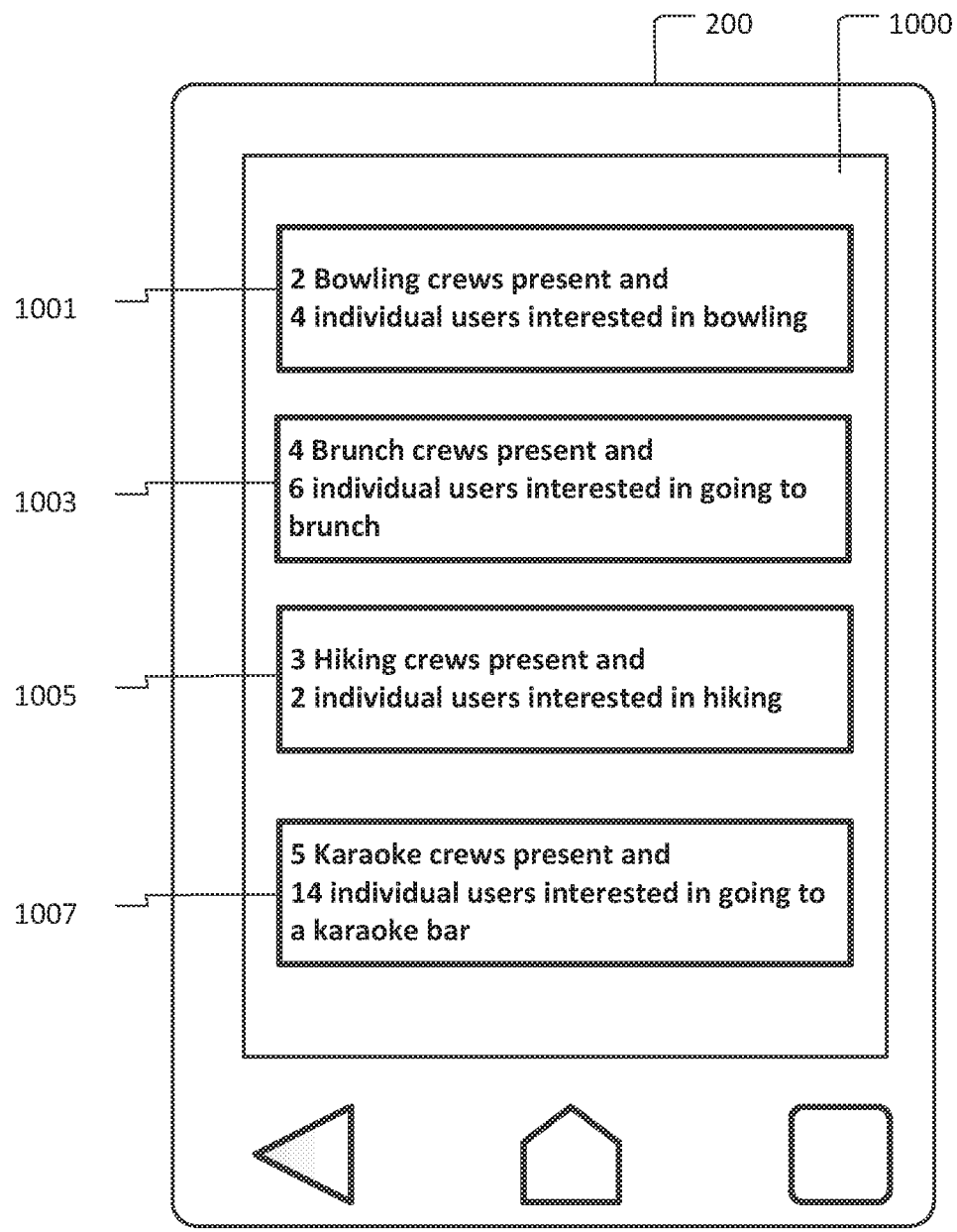
FIG. 10 is a diagram of an example of a user interface, according to aspects of the disclosure.
Figure 11:
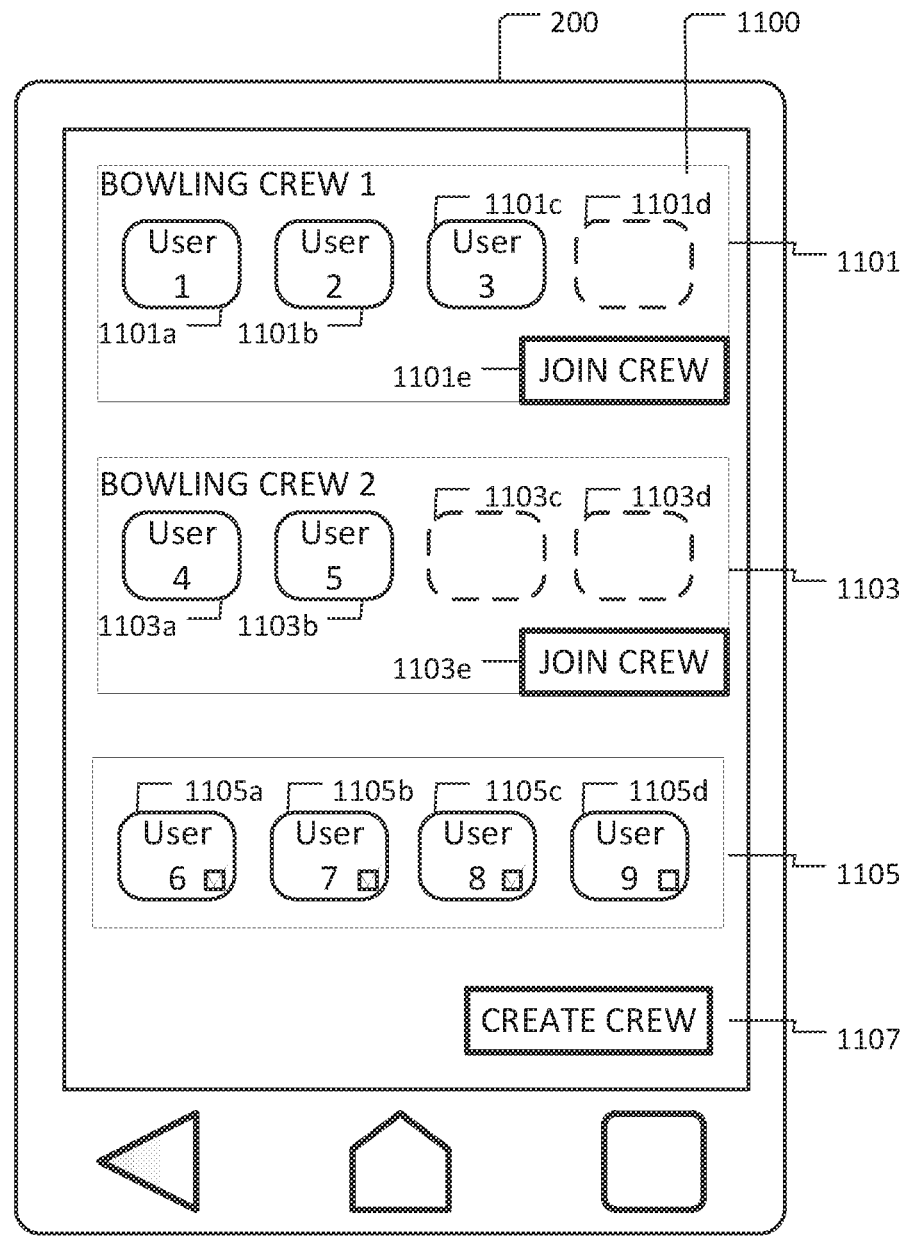
FIG. 11 is a diagram of an example of a user interface, according to aspects of the disclosure.

FIGS. 9-11 are diagrams depicting an example of a user interface for performing activity searches. According to the example, the user interface includes a screen 900 (shown in FIG. 9), a screen 1000 (shown in FIG. 10), and a screen 1100 (shown in FIG. 11). Each of the screens 900-1100 may be presented on the display of the client device 200.

As illustrated in FIG. 9, the screen 900 may include input areas 901, 903, 905, and 907, and a button 909. Each of the input areas 901-907 may include an "activity type" text input field in which the user can input an identifier of an activity the user is interested in. In addition, each of the input areas 901-907 may include a "date" text input field in which the user may input the date on which the user is interested in engaging in the input area's respective activity. Furthermore, each of the input areas 901-907 may include a "time" text input field in which the user may input the time when the user is interested in engaging in the input area's respective activity.

Moreover, each of the input areas 901-907 may include a menu for specifying whether the user wants to engage in the input area's activity with crew members who are the same gender as the user. As illustrated, the menu may include "yes" and "no" buttons. The user can press the "yes" button to indicate that the user wants to engage in the activity only with people who are the same gender as the user. By contrast, the user can press the "no" button to indicate that the user wants to engage in the activity with people of any gender. Although in the present example the input areas 901-907 are used to specify preferred gender, in some implementations, the input areas 901-907 may be used to specify any suitable type of additional search condition. For example, the input area 907 may be used to specify a preferred crew size, a preferred average age for the members of the crew, a preferred educational level for the members of the crew, etc.

In the present example, input area 901 includes text indicating that the user is interested in bowling on Jan. 22, 2016, at 9:00 pm. Similarly, the input area 903 includes text indicating that the user is interested in going to brunch on Jan. 23, 2016, at 1:00 pm. Input area 905 includes text indicating that the user is interested in going hiking on Jan. 23, 2016, at 8:00 am. Input area 907 includes text indicating that the user is interested in going to a karaoke bar on Jan. 22, 2016, at 11 pm. Although in this example each of the input areas includes a text input field for specifying the user's search criteria, any other suitable type of input component may be used instead. For example, any of the input areas 901-907 may include one or more of a push button, a drop down menu, a radio button, etc.

When the button 909 is pressed, the client device 200 may generate a search query based on the information entered in one or more of the input areas 901-907 and transmit the search query to the ANS 300. In the present example, the search query may include an indication of the activities the user is interested in (e.g., bowling, brunch, hiking, and karaoke), indications of the respective dates when the user would like to engage in each activity, and indications of the respective times when the user would like to engage in each activity. Furthermore, the search query may specify one or more additional search criteria. For example, the search query may indicate that the user is interested in crews whose members are the same gender as the user. As another example, the search query may indicate that the user is interested in crews whose average member age is 35. As yet another example, the search query may indicate that the user is interested in crews that are formed of members of a particular profession (e.g., accountants).

In some implementations, the button 909 may be replaced with any other suitable type of input component. Additionally or alternatively, in some implementations, the button 909 may be altogether omitted, and the search query may be generated and/or transmitted when a predetermined type of touch gesture is performed on the screen of the client device 200.

Upon receiving the search query, the ANS 300 may search the UDB 307 for users whose profiles match the search query. As a result of the search, the ANS 300 may identify one or more users who match the search query. Furthermore, the ANS 300 may search the CDB 309 for crews whose profiles match the search query. As a result of the search, the ANS 300 may find one or more crews whose profiles match the search query.

For example, a user's profile may match the search query if the user's profile indicates that the user is interested in participating in the activity identified by the search query, at the time specified by the search query. As another example, a crew's profile may match the search query if it indicates that the crew is associated with the activity identified by the search query and intends to meet at the time specified by the search query. According to aspects of the disclosure, any suitable type of rule (or criterion) may be used for determining whether a user/crew matches the search query, and the present disclosure is not limited to exact matches only. For example, a user who has indicated that he is available within 3 hours of the time specified by the search query may be considered to match the search query.

After the search of the UDB 307 and the CDB 309 is complete, the ANS 300 may generate a search results list that includes the identifiers of all (or some) crews that match the search query and/or all (or some) users who match the search query.

In response to receiving the search results, the client device 200 may generate the search results summary screen 1000 depicted in FIG. 10. Specifically, the client device 200 may tabulate the search results and generate input components 1001-1007 based on the outcome of the tabulation. Each of the input components 1001-1007 may be associated with one specific activity. Additionally or alternatively, each of the input components 1001-1007 may be associated with a different activity. Additionally or alternatively, each of the input components 1001-1007 may include an indication of the number of crews in the search results that are associated with the input component's activity.

Additionally or alternatively, each of the input components 1001-1007 may include an indication of the number of individual users who are interested in engaging in the input component's respective activity at the time specified by the search query.

When one of the input components 1001-1007 is selected, a screen associated with the input component's respective activity may be displayed. For example, when the input component 1001 is selected, the screen 1100 may be displayed, in response.

As illustrated in FIG. 11, the screen 1100 may include a plurality of crew indicators (e.g., crew indicators 1101 and 1103) corresponding to crews that are assembled for the purpose of bowling at the time specified by the search query. In addition, the screen 1100 may include a user identification area 1105 containing identifiers of different users that match the search query.

As illustrated, the crew indicator 1101 may be associated with a first crew that is assembled for the purpose of bowling. The crew indicator 1101 may include member identifiers 1101*a*, 1101*b*, and 1101*c* that identify users who have already joined the first crew. The crew indicator 1101 may further include an empty seat indicator 1101*d* indicating that there is one empty spot available on the first crew. In some implementations, for each empty spot on the first crew, a different empty seat indicator may be displayed in order to appraise the user of how many spots are available on the first crew.

Furthermore, the crew indicator 1101 may include a button 1101*e*. When the button 1101*e* is pressed, the client device 200 may transmit to the ANS 300 a request to join the first crew. In some implementations, the button 1101*e* may be replaced with any other suitable type of input component. Additionally or alternatively, in some implementations, the button may be altogether omitted and the request to join the crew may be transmitted in response to the user performing a predetermined type of touch gesture on the crew indicator 1101. For example, the request may be transmitted in response to the user sliding his finger on the crew indicator from left to right (e.g., by performing a sliding gesture).

The crew indicator may 1103 may be associated with a second crew that is assembled for the purpose of bowling. The crew indicator 1103 includes member identifiers 1103*a*, 1103*b* that identify users who have already joined the second crew. The crew indicator 1103 may further include empty seat indicators 1103*c* and 1103*d* corresponding to empty spots that are available on the second crew. Furthermore, the crew indicator 1103 may include a button 1103*e*. As indicated above, when the button 1103*e* is pressed, the client device 200 may transmit to the ANS 300 a request to join the second crew.

The user identification area 1105 may include identifiers 1105*a-d* of different users that match the search query input on the screen 900. In some implementations, each identifier may include a check box for selecting the user corresponding to that identifier.

When the button 1107 is pressed, the electronic device may generate and transmit to the ANS 300 a request to form a new crew for engaging in the activity associated with the screen 1100 (e.g., bowling) at the time specified for the activity by the search query. According to aspects of the disclosure, the search request may be generated based on any number of the information items entered in the input area 901 of the screen 900. An advantage of this arrangement is that it relieves the user from having to input the same information twice when the user decides that he or she does not want to join any of the existing crews that match the search query and instead opts to start a new crew.

Additionally or alternatively, when the button 1107 is pressed, the client device may automatically transmit an invitation to one or more of the users that are selected from the user identification area 1105. For example, the client device 200 may wait to receive a confirmation from the ANS 300 that the new crew has been formed. The confirmation may include an identifier corresponding to the new crew. After the confirmation is received, the client device 200 may transmit to the selected users (e.g., users 6, 7, and 8) an invitation to join the crew. The invitation may include the crew identifier. The users 6, 8, and 8 may then use the crew identifier to generate and transmit to the ANS 300 a request to join the new crew.

Figure 12:
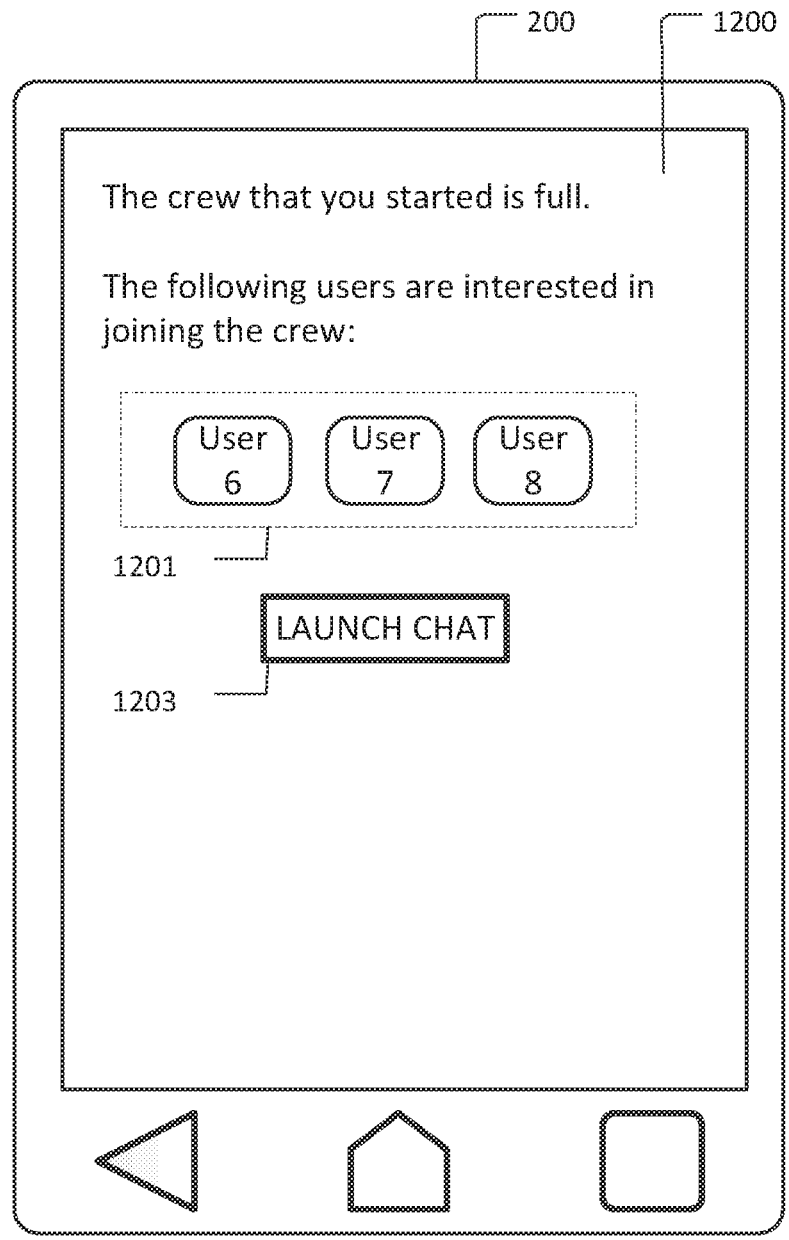
FIG. 12 is a diagram of an example of a user interface, according to aspects of the disclosure.

FIG. 12 depicts an example of a screen 1200 which is displayed on the client device 200 (e.g., the device of the founder of the crew) when all spots on the new crew (i.e., the crew formed by using the screen 1100) are occupied. In some implementations, the client device 200 may display the screen 1200 in response to receiving a message from the ANS 300 which indicates that all spots on the crew have been taken.

As illustrated, the screen 1200 may include a member identification area 1201 which identifies all users who have joined the crew. In addition, the screen 1200 may include a button 1203. When the button 1203 is pressed, the client device 200 may start a chat session with the members of the crew. In some implementations, access to the chat session may be limited to the members of the crew only.

Although in this example the chat session is launched by the crew founder (e.g., the user of the client device 200), in some implementations the chat session (or another type of communications session) may be launched by any other crew member. For example, any of the members of the crew may be given the capability (via the screen 1200) to initiate contact with one or more other crew members for the purposes of confirming crew membership and/or planning an activity.

Figure 13:
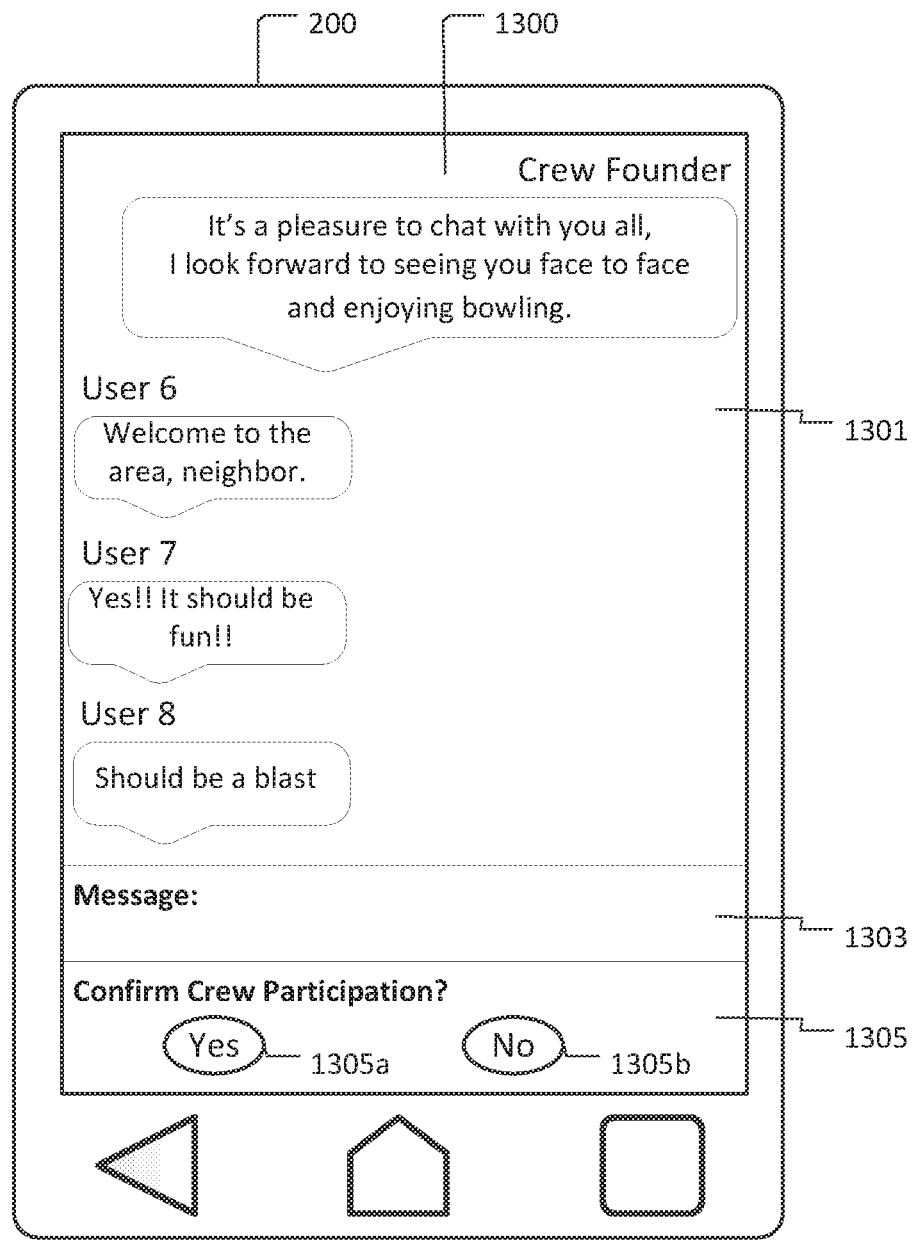
FIG. 13 is a diagram of an example of a user interface, according to aspects of the disclosure.
Figure 14:
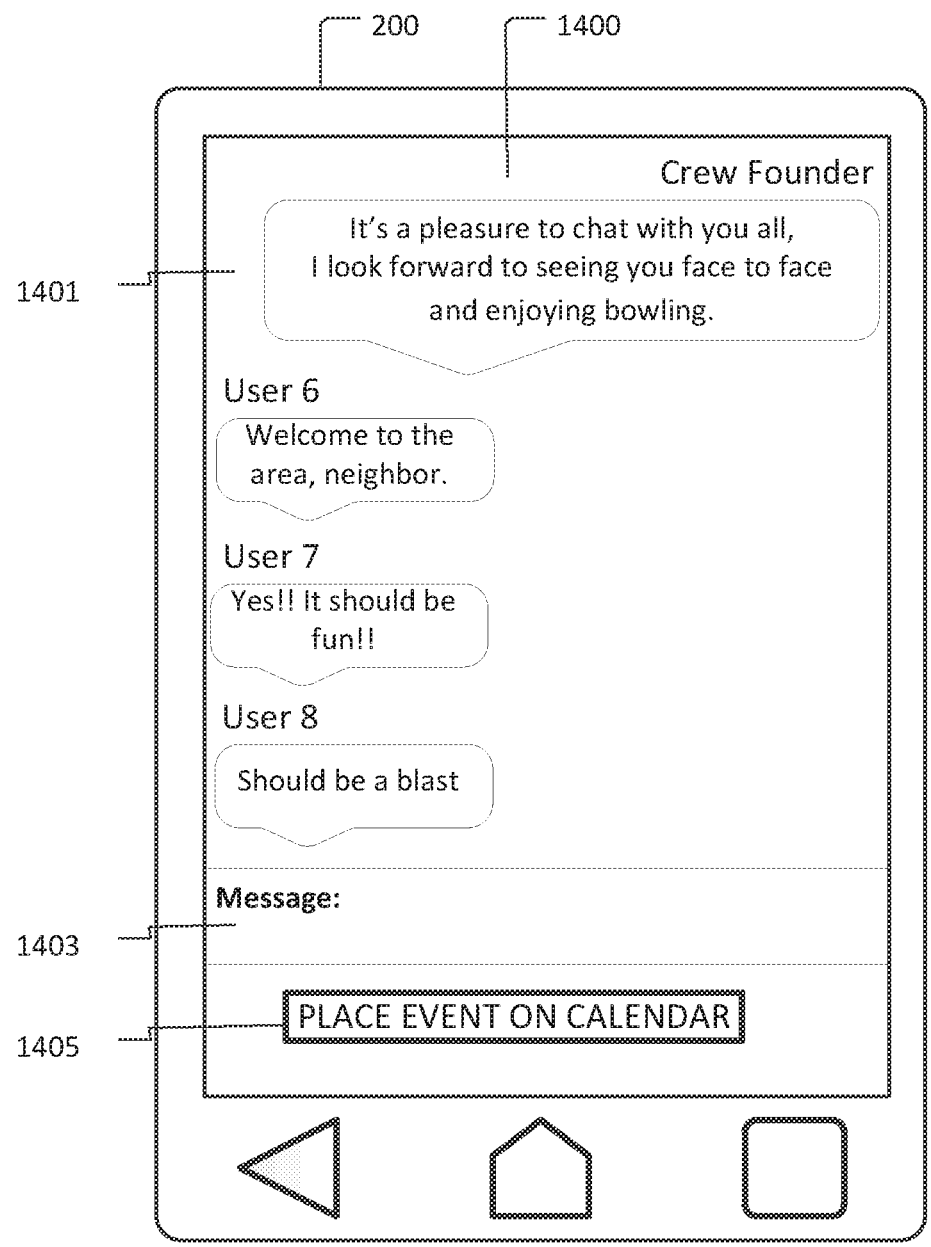
FIG. 14 is a diagram of an example of a user interface, according to aspects of the disclosure.

FIGS. 13-14 depict respective user interfaces for conducting the chat session. More specifically, FIG. 13 depicts an example of a screen 1300 which can be displayed on the client devices of users 6, 7, and 8 (i.e., users who are not founders of the crew). And FIG. 14 depicts an example of screen 1400 which can be displayed on the client device of the founder of the crew (i.e., the client device 200).

As illustrated, the screen 1300 may include a message area 1301, a message input field 1303, and a confirmation area 1305. The message area 1301 may include one or more messages that are posted by different crew members. The message input field 1303 may be used for the input of new messages. The confirmation area 1305 may include a "yes" button 1305*a* and a "no" button 1305*b*. When the "yes" button 1305*a* is pressed, the client device displaying the screen 1300 may transmit a message confirming the membership in the crew of the client device's user. Alternatively, when the "no" button 1305*b* is pressed, the client device displaying the screen 1300 may transmit a message for withdrawing from the crew (e.g., a message cancelling crew membership) of the client device's user. As noted above, the message may be transmitted to the ANS 300 and/or directly to the client device 200 (e.g., the client device of the founder of the crew).

The screen 1400 may include a message area 1401, a message input field 1403, and a button 1405. The message area 1401 may include one or more messages that are posted by different crew members. The message input field 1403 may be used for the input of new messages.

When the button 1405 is pressed, the client device 200 may transmit a message to the ANS 300 which instructs the ANS 300 to distribute to all crew members a calendar appointment for a meeting of the crew (e.g., a meeting at a bowling alley on Jan. 22, 2016, at 9:00 pm). Additionally or alternatively, when the button 1405 is pressed, the client device 200 may distribute the calendar appointment by itself. Additionally or alternatively, when the button 1405 is pressed, the client device 200 may automatically add the calendar appointment to a calendar application that is executed on the client device. Thus, in some implementations, the pressing of the button 1405 may trigger both the distribution of the calendar appointment to the crew members who have confirmed their membership in the crew and the addition of the calendar appointment to a calendar application that is executed locally.

In some implementations, the button 1405 may be hidden from the screen 1400 (or otherwise disabled) until a message is received from the ANS 300 indicating that all (or predetermined number of) members of the crew have confirmed their membership. Additionally or alternatively, in some implementations, the button 1405 may be hidden (or otherwise disabled) until the client device 200 receives membership confirmations from all (or predetermined number of) members of the crew. Additionally or alternatively, in some implementations, the button 1405 may be replaced by any suitable type of input component (e.g., a slider). Additionally or alternatively, in some implementations, the button 1405 may be replaced by a prompt (e.g., audible prompt or textual prompt) for the user to perform a touch gesture (e.g., a sliding gesture) which when detected by the client device 200 causes the client device to transmit the request to the ANS 300.

FIGS. 1-14 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

Having described at least one of the preferred embodiments of the present invention with reference to the accompanying drawings, it will be apparent to those of skill in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An apparatus for activity networking, comprising: a memory coupled to at least one processor, the processor being configured to:
    transmit, to a server, a request to form a crew, the request including an indication of an activity associated with the crew, an indication of a time for performing the activity, and an indication of a number of available spots on the crew;
    receive, from the server, a message indicating that a predetermined number of spots on the crew is occupied by a plurality of users, the message including a unique identifier for conducting communications sessions;
    initiate a communications session with the plurality of users by using the unique identifier, the initiating including displaying a graphical user interface for conducting the communications session;
    receive a respective confirmation of membership in the crew from at least some of the plurality of users;
    and provide at least those of the plurality of users who have confirmed their membership in the crew with a calendar appointment for the activity, the calendar appointment being provided while the communications session is being conducted, the calendar appointment being provided in response to an activation of first input component of the graphical user interface:
    wherein the first input component of the graphical user interface is hidden or disabled before the respective confirmations of membership in the crew are received and the at least one processor is further configured to display or enable the first input component of the graphical user interface in response to receiving the respective confirmations of membership in the crew, the first input component being displayed or enable before the calendar appointment is provided.

2. The apparatus of claim 1, wherein the calendar appointment is provided to the plurality of users in response to detecting that each of the plurality of users has confirmed the user's membership in the crew.

3. The apparatus of claim 1, the processor being further configured to detect an input to the graphical user interface that activates the first input component, wherein the calendar appointment is provided in response to the input.

4. The apparatus of claim 1, wherein the request includes an indication of a condition for joining the crew, the condition being based on at least one of gender, age, and location.

5. The apparatus of claim 1, wherein the user interface includes a screen that is configured to display a message area concurrently with the first input component, the message area being arranged to display messages that are exchanged between the users.

6. The apparatus of claim 5, wherein the user interface includes a button that is hidden prior to the respective confirmations of membership being received.

7. The apparatus of claim 1, wherein the at least one processor is further configured to display a screen that identifies one or more crews for engaging in the activity and a second input component for forming a new crew, wherein the request to form a new crew is transmitted in response to the second input component being activated.

8. The apparatus of claim 1, wherein the least one processor is further configured to:
receive a user input identifying one or more crew characteristics;
generate a search query based on the user input;
display a search results screen that identifies one or more search results that are obtained in response to the search query; and
generate the request to form a new crew based on the user input.

9. The apparatus of claim 8, wherein the search results screen and the first input component are displayed concurrently with one another.

10. The apparatus of claim 1, wherein:
providing the calendar appointment for the activity includes providing the calendar appointment directly to the users; and
receiving the confirmation of membership in the crew from at least one of the plurality of users includes receiving the confirmation of membership directly from the user.

11. A method for activity networking, comprising:
transmitting, from an electronic device to a server, a request to form a crew, the request including an indication of an activity associated with the crew, an indication of a time for performing the activity, and an indication of a number of available spots on the crew;
receiving, by the electronic device, a message indicating that a predetermined number of spots on the crew is occupied by a plurality of users, the message including a unique identifier for conducting communications sessions;
initiating a communications session with the plurality of users by using the unique identifier, the initiating including displaying a graphical user interface for conducting the communications session;
receiving a respective confirmation of membership in the crew from at least some of the plurality of users; and
providing at least those of the plurality of users who have confirmed their membership in the crew with a calendar appointment for the activity, the calendar appointment being provided while the communications session is being conducted, the calendar appointment being provided in response to an activation of a first input component of the graphical user interface for conducting the communications session, wherein the first input component of the graphical user interface is hidden or disabled before the respective confirmations of membership in the crew are received, the method further comprising displaying or enabling the first input component of the graphical user interface in response to receiving the respective confirmations of membership in the crew, the first input component being displayed or enabled before the calendar appointment is provided.

12. The method of claim 11, wherein the calendar appointment is provided to the plurality of users in response to detecting that each of the plurality of users has confirmed the user's membership in the crew.

13. The method of claim 11, further comprising detecting an input to the graphical user interface that activates the first input component, wherein the calendar appointment is provided in response to the input.

14. The method of claim 11, wherein the request includes an indication of a condition for joining the crew, the condition being based on at least one of gender, age, and location.

15. The method of claim 11, wherein the user interface includes a screen that is configured to display a message area concurrently with the first input component, the message area being arranged to display messages that are exchanged between the users.

16. The method of claim 15, wherein the user interface includes a button that is hidden prior to the respective confirmations of membership being received.

17. The method of claim 11, further comprising displaying a screen that identifies one or more crews for engaging in the activity and a second input component for forming a new crew, wherein the request to form a new crew is transmitted in response to the second input component being activated.

18. The method of claim 11, further comprising:
receiving a user input identifying one or more crew characteristics;
generating a search query based on the user input;
displaying a search results screen that identifies one or more search results that are obtained in response to the search query; and
generating the request to form a new crew based on the user input.

19. The method of claim 11, wherein the search results screen and the first input component are displayed concurrently with one another.

20. The method of claim 11, wherein:
providing the calendar appointment for the activity includes providing the calendar appointment directly to the users; and
receiving the confirmation of membership in the crew from at least one of the plurality of users includes receiving the confirmation of membership directly from the user.

* * * * *